C. E. PEDERSEN.
APPARATUS FOR MANUFACTURING HORSESHOES.
APPLICATION FILED APR. 29, 1902.
953,759.	Patented Apr. 5, 1910.
6 SHEETS—SHEET 1.
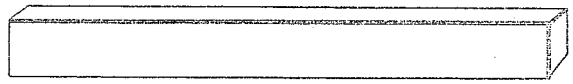
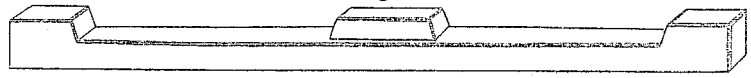
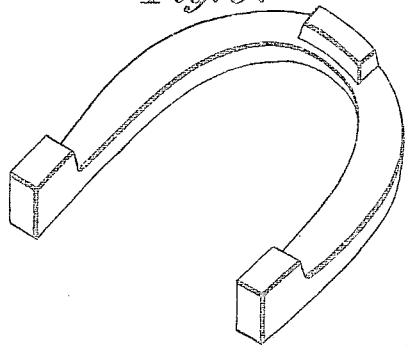
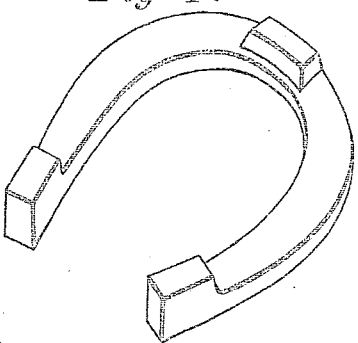
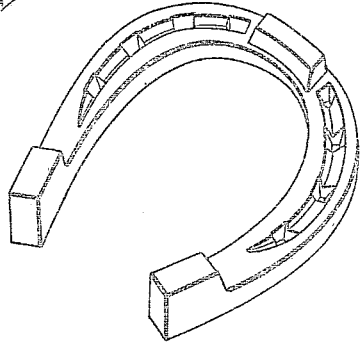
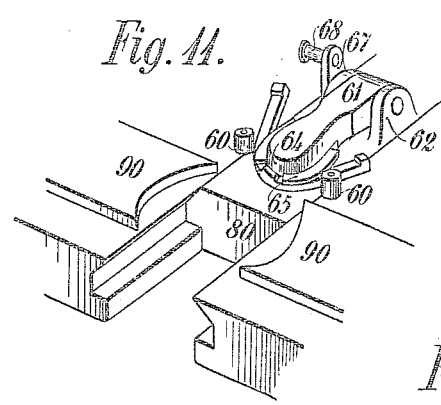
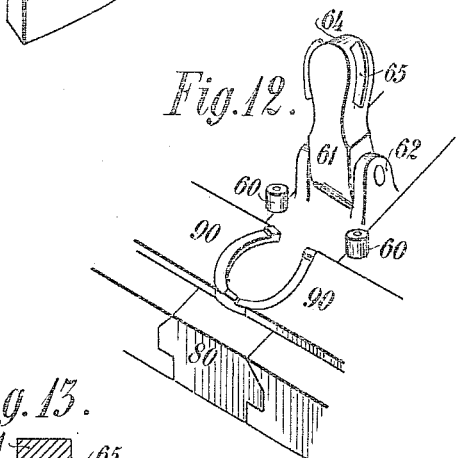
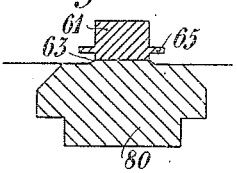

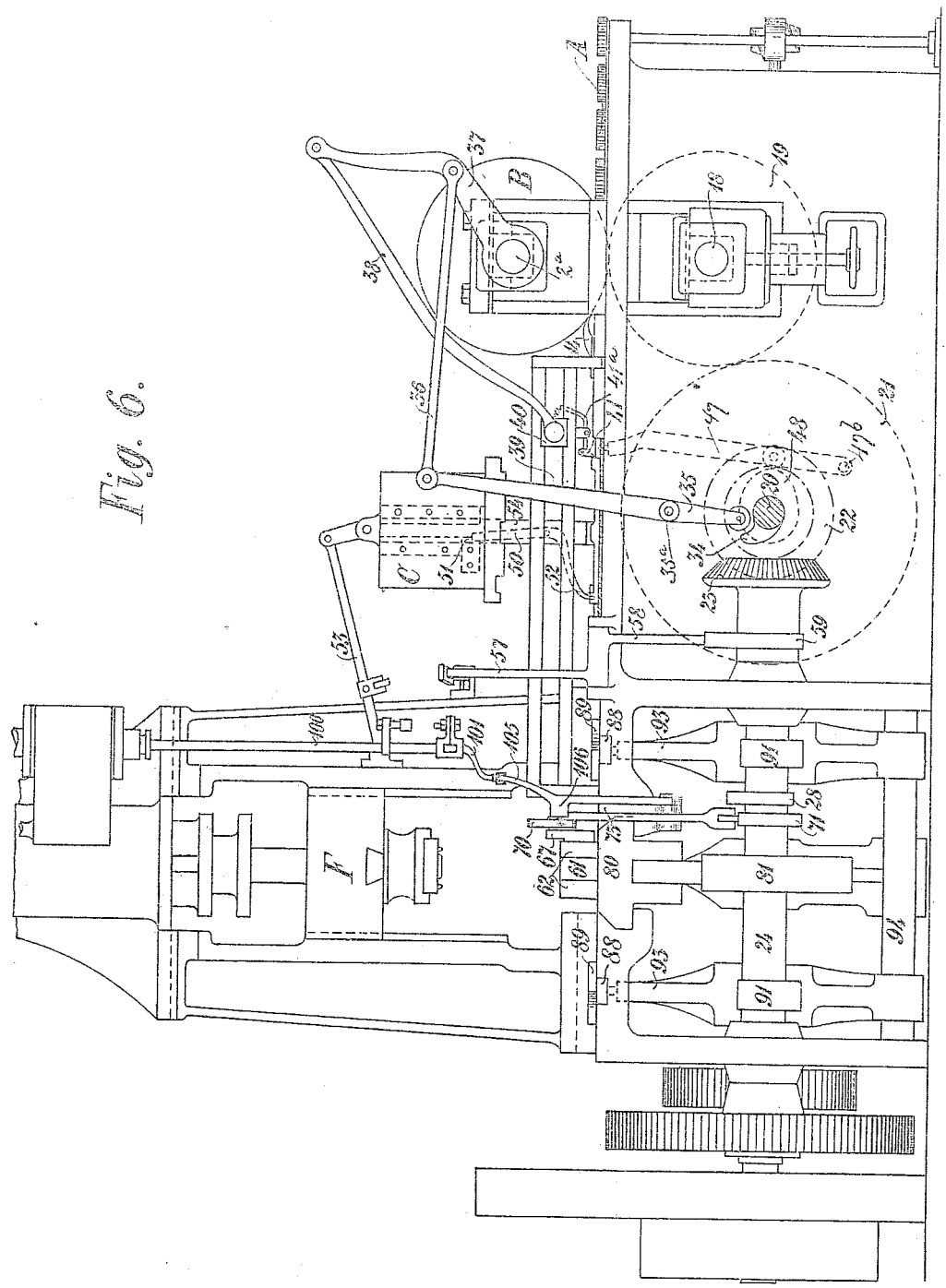

C. E. PEDERSEN.
APPARATUS FOR MANUFACTURING HORSESHOES.
APPLICATION FILED APR. 29, 1902.
953,759.
Patented Apr. 5, 1910.
6 SHEETS—SHEET 3.
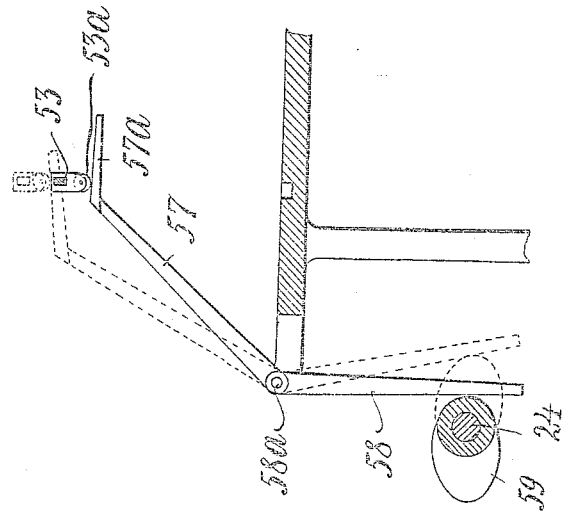
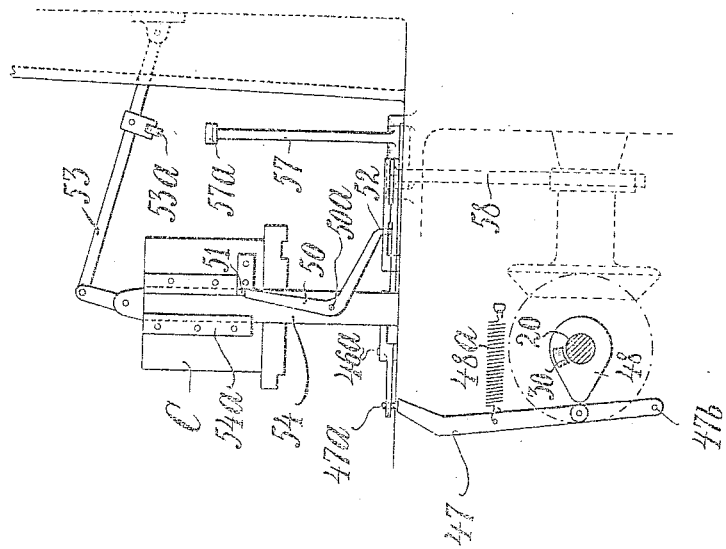
Witnesses:
Inventor:
Carl Emil Pedersen
by Max Georgii
his Attorney C. E. PEDERSEN.
APPARATUS FOR MANUFACTURING HORSESHOES.
APPLICATION FILED APR. 29, 1902.

953,759.

Patented Apr. 5, 1910.
6 SHEETS—SHEET 4.

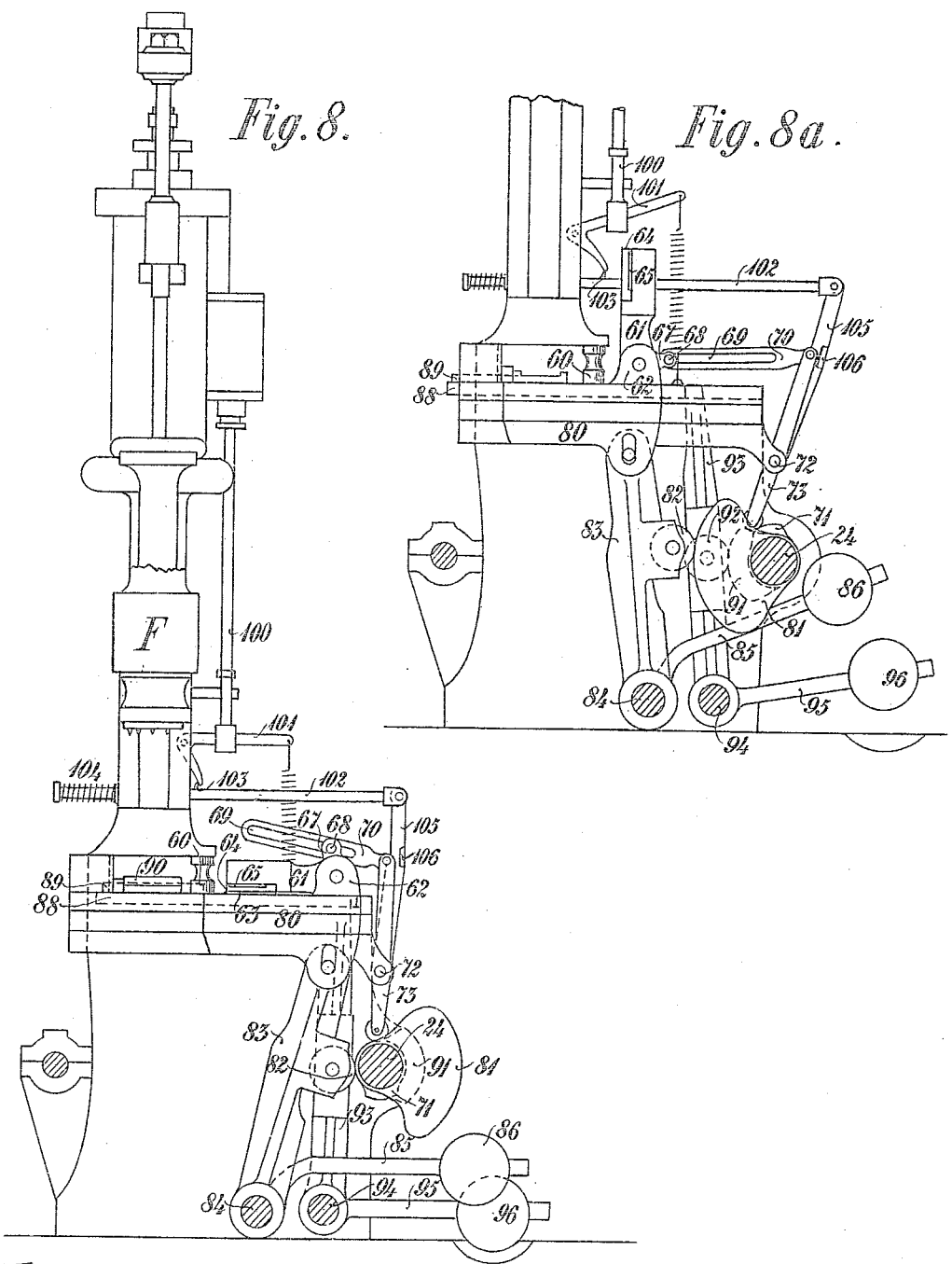

C. E. PEDERSEN.
APPARATUS FOR MANUFACTURING HORSESHOES.
APPLICATION FILED APR. 29, 1902.
953,759.
Patented Apr. 5, 1910.
6 SHEETS—SHEET 6.
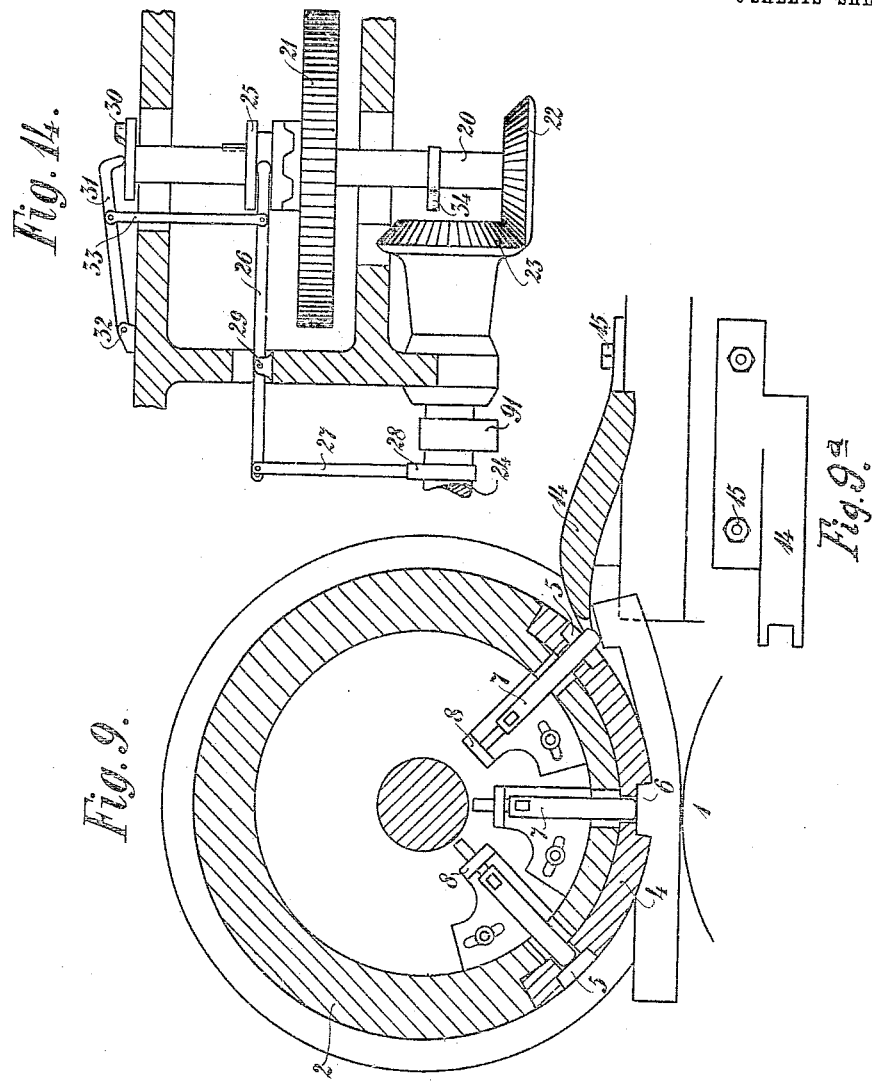
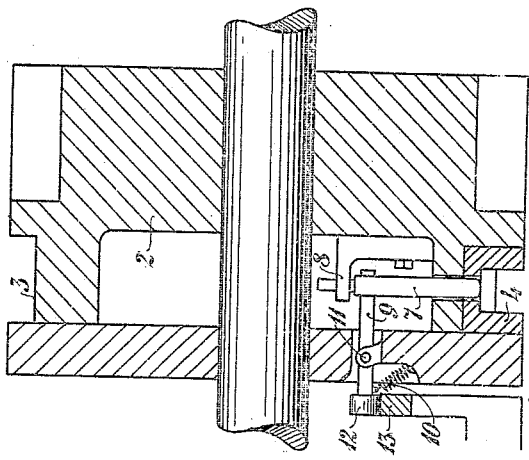

UNITED STATES PATENT OFFICE.

CARL EMIL PEDERSEN, OF TÖNSBERG, NORWAY.

APPARATUS FOR MANUFACTURING HORSESHOES.

953,759.      Specification of Letters Patent.      Patented Apr. 5, 1910.

Application filed April 29, 1902. Serial No. 105,222.

*To all whom it may concern:*

Be it known that I, CARL EMIL PEDERSEN, a subject of the King of Norway and Sweden, residing at Tönsberg, Norway, have invented certain new and useful Improvements in Apparatus for Manufacturing Horseshoes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a process for manufacturing horse-shoes and lies in a machine for carrying out said process of manufacture.

In my improved process I make use of a blank in the form of a rod of iron of rectangular cross section. This blank is heated before entering the machine and is then without any further heating passed through the whole machine till it has obtained its finished form.

In the annexed drawing: Figures 1–5 show the blank in its five different stages from the rectangular rod or bar, Fig. 1, to the finished horse-shoe, Fig. 5. Fig. 5ª is a section through Fig. 5. Figs. 6, 7 and 8 show respectively an elevation, plan view and a transverse-section of a preferred constructional form of the machine; Figs. 6ª and 7ª show in front and side elevation certain details; Fig. 8ª is a view similar to Fig. 8, but showing the parts in a different position; Figs. 9, 9ª and 10 are details relating to the rolling-device, Figs. 11, 12 and 13 details relating to the bending-device and Fig. 14 shows a coupling-mechanism for the rolling-device.

In carrying out my improved process I make use of a rolling-device, a bending-device and a steam-hammer or its equivalent.

By means of the rolling-device the straight blank, Fig. 1, is transformed into the form shown in Fig. 2, that is to say it is lengthened and provided with toe and heel calks. In this form the blank is pushed into the bending-apparatus, which first imparts to it the form shown in Fig. 3, and then the form shown in Fig. 4. During these operations the blank has been moved under the hammer and a blow of the latter gives the shoe the finished form with an inclined flat for the hoof, countersunk grooves and holes for the nails and the heads of nails. By this simple operation a perfect form of the horseshoe is obtained and, as the bending is done in one operation with the transfer of the blank to the steam hammer, the entire operation is so short and continuous, that the shoe receives the blow of the hammer when it is still quite white hot.

The general arrangement of the machine is clearly shown in plan in Fig. 7. The blank W is, by means of a feeding apparatus consisting of rolls driven in a suitable manner, as shown in Figs. 6 and 7, carried into the rolling-apparatus B; from this it comes out on the other side and is here carried through a channel D to the bending-apparatus E. This latter apparatus acts in such a manner that while bending the shoe to the form shown in Fig. 3, it moves it to the position shown in dotted lines in Fig. 7, where it rests beneath the steam-hammer. Before the hammer F gives the shoe its blow, the rear ends of the shoe are bent inwardly by means of a special device arranged at the foot of the hammer.

A difficulty in carrying out the process lies in the tendency of the blank to twist during the bending. As the form of the blank, when coming into the bending-apparatus is very important as affecting the manner in which the bending operation will be performed, it has appeared expedient to employ a smoothing device C, consisting of a drop-hammer, which gives the blank a blow, when it comes out of the rolling-device into the channel D. By means of this hammer the blank, which may have received a somewhat twisted form during the rolling operation is smoothed horizontally so that the bending-apparatus will be able to act efficiently.

The constructive arrangement of the machine, shown in the drawing, and the manner of operation of the different working-tools will be hereafter more fully described.

The arrangement of the rolling-apparatus appears from Figs. 9 and 10. The lower roll 1 is smooth, the upper roll 2 is provided with a groove 3 and in this groove the mold 4 is disposed. This mold is provided with recesses 5, 5 and 6, corresponding to the toe and heel calks. The blank is fed between the rolls so that its smallest side will be horizontal and the dimension of this side corresponds to the desired thickness of the toe and heel calks.

In order to loosen the blank from the mold, there are arranged three pushers or ejectors 7 in the roll, which are movable radially in a bore in the bottom of recesses 5, 5 and 6. The ejectors are guided in a guide 8 and are held in their retired position by means of a lever 9 which is actuated by a spring 10 and is rotatable on a pivot 11 and carries at its free extremity a roller 12. This roller comes, during the rotation of the rolling-apparatus, in contact with a cam 13 which is secured to the frame and forces the roller inwardly. The ejectors are thereby moved outwardly and force the blank out of the mold. In front of the roll, at the beginning of the chute D, a piece with a rib 14 is secured at one side of the same, so that its point catches over the edge of the blank and forces it downwardly. Owing to the form of this rib the blank is now during the continued rotation of the roller restored to a somewhat straight form before it is carried forward through the channel.

The rollers have a reciprocating or oscillating motion and, after each rolling operation they return to their starting-position. In the rolling operation the motion of the rollers is effected by a cog-wheel 21, placed on the shaft which cog-wheel engages a similar wheel 19, on the shaft 18 of the lower roller. The shaft 20 is driven from the main-shaft 24 of the machine by means of bevel-gears 22, 23. The wheel 21 is loosely placed on shaft 20, and rotates with it only when a coupling is effected. The arrangement of this coupling is shown in Fig. 14. The coupling-sleeve 25, which is movable axially on the shaft, is actuated for engagement (the shown position) by a rod 27, which acts on the fork 26, and which is mounted in the frame of the machine, and the other extremity of which is actuated by a cam 28 on the driving shaft. The fork is pivoted at 29. The disengaging of the coupling is performed by means of a cam 30 on the end of shaft 20, which cam acts against a lever 31 which is pivoted at 32 and, by means of a link 33, is connected with the fork 26.

The backward motion of the rollers is effected by means of a lever or crank 37 (see Fig. 6) keyed to the shaft 2ᵃ of the upper roller. This lever is by means of a rod 36 connected with a lever 35, which has its pivot at 35ᵃ on the frame and whose lower end is so disposed as to be hit by a cam 34 on the shaft 20. By the rotation of this shaft it will be seen that the said lever system will cause a partial rotation of the rollers. The feeding device for the blank through the chute D to the bending device is also connected to this latter mechanism, a rod 38 passing from the prolonged end of the lever 37 down to a sliding-block 40 in guide 39, to which the feeding-hook 41 is secured. The guide 39 is mounted above the machine bed parallel to the channel D and the hook 41 is placed on a swinging lever 41ᵃ whose other end is acted upon by a spring as shown. This feeding hook 41 feeds the blank from the position shown in Fig. 6 to the bending apparatus on the bed 80.

The feeding of the blank from the rollers to the point where the hook 41 catches behind it, is performed by means of a pusher and a lever and rod system illustrated in Fig. 7 and Fig. 7ᵃ. 42 is the pusher in the form of a sliding piece, sliding in the guide 42ᵃ, placed on the bed of the machine parallel with the channel D. 44 is a swinging lever having its pivot at 44ᵃ on the machine bed; this lever is by means of the rod 43 connected with the pusher 42, and by means of the rod 45 with the lever 46, which is pivoted at 46ᵃ. The other end of this lever has a slot 46ᵇ into which a pin 47ᵃ on a vertical lever 47 projects. As will be seen from Fig. 7ᵃ, which is a rear view of this part of the machine, the lever 47 is pivoted at 47ᵇ and is held against the disk or cam wheel 48 on the shaft 20 by a spring 48ᵃ. By the rotation of this shaft the lever 47 will be put in a reciprocating motion, which motion, in the manner above described, is transmitted to the pusher 42. The pusher 42 catches behind the front calk while the feeding hook 41 catches behind the rear end of the blank as shown.

I will now describe the machine for operating the smoothing hammer C, reference being had to Figs. 6, 6ᵃ and 7ᵃ, Fig. 6ᵃ being a partial cross-section of the machine taken between the smoothing hammer and the steam-hammer and looking toward the latter.

The smoothing hammer is hung on the end of a lever 53 and is vertically guided by means of a standard 54 which is embraced by suitable guides 54ᵃ on the back of the hammer body. This hammer and accessories are not shown in the plan view, Fig. 7. It is held in its upper position (shown in Figs. 6 and 7ᵃ) by means of a lever 50, pivoted at 50ᵃ to the standard and having its upper end placed underneath a lug 51 on the back of the hammer. The other end of the lever 50 has a detent 52, which projects into the path of the pusher 42, so that when this pusher reaches the end of its path it hits the detent and tips the lever so the hammer is free to drop. The raising of the hammer to its lifted position is performed by the following means (see Fig. 6ᵃ): On the lever 53 a roller 53ᵃ is mounted near the pivot of the lever. Below this roller a lever, having two arms 57 and 58, is pivoted at 58ᵃ to the frame of the machine. The arm 58 extends downwardly and rests against a cam wheel 59 on the shaft 24. The top of the arm 57 is formed with an offset 57ᵃ which has a flat upper face with which the roller 53 may come in rolling contact. When the hammer C is in its lower position and the arm 57 is swung upward by the action of the cam 59 on the arm 58 the offset 57ᵃ will lift the roller 53ᵃ with the lever 53 and thereby raise the hammer, whereupon the arm 50 will act as a latch catching underneath the lug 51.

Immediately after the blank has received the blow of the smoothing-hammer, the latter is lifted up and the blank is pushed forward to the bending-apparatus E, where it comes to rest between vertical rollers 60 on the one side and the mold 61 on the other. The manner of operation and the construction of this part of the machine appears from Figs. 7 and 8 and particularly from Figs. 11, 12 and 13. The most essential part of the bending-apparatus is the mold 61, which consists of a block or arm mounted on pivots carried by lugs 62 on a firmly constructed slide 80 which slide also serves, at one extreme of its movement, as an anvil or support beneath the hammer. The mold proper has on its front a round face 64, corresponding to the inner-side of the shoe, and flanges 65 are arranged above this face. The blank rests underneath these flanges, and when the slide is carried forward the rollers 60 force the ends of the blank inwardly.

In order that the pressure on the mold shall not make it turn upward during the bending operation, its pivots are disposed in a plane above the mold-face, whereby the mold will have a tendency to move downward when exposed to a horizontal pressure. The slide 80 is moved by means of a cam 81 on the shaft 24. This cam rests against a roller 82 on the lever 83, which projects from the shaft 84 and is connected with its upper end to the slide 80. On the shaft 84 an arm 85 is disposed with counterweights 86, which carries the slide back to the starting-position.

When the mold-slide has come forward to its end-position the blank and the mold occupy a position immediately beneath the steam hammer, as shown in dotted lines in Fig. 7, and now the lateral dies 90, 90 come into action. These are arranged in guides in the foot of the steam-hammer and are moved by means of inclined pieces 89, which are secured to the slides 88 and project into grooves in the under-side of the dies 90. The slides 88 move in grooves in the frame and are at the other end connected loosely to the upper end of the arms 93, which are secured on shaft 94 and carry a roller 92, against which the cam 91 rests. The shaft 94 has an arm 95 with counterweight 96, which carries the slides 88 with the dies 90 back to the starting-position.

Before the hammer drops the mold 61 must be lifted up and to one side, so that the shoe will rest freely on the slide 80, forming the anvil. For this purpose it is arranged as a swinging arm. For lifting it from position shown in Fig. 8 to the position shown in Fig. 8ᵃ a cam 71 is arranged on shaft 24. Against this cam rests the lower end of a lever 73, which is pivoted at 72. The upper end of this lever is connected to a rod 70, which has a slot into which a pin 68 projects, said pin being mounted on an arm 67, which latter is connected to the mold. When the mold is in its advanced position (under the hammer) the pin will be at the end of the slot 69 and when the cam moves the lever 73, the latter will thereby swing the mold upwardly. When the mold returns it is struck downward to its working-position by means of the pin contacting with the other end of the slot 69. On the mold slide there is an elevated face 63 underneath the mold, said face having inclined sides, which produce an incline on that side of the shoe which lies next to the hoof.

The disengaging mechanism of the steam-hammer (see Figs. 8 and 8ᵃ) consists of a bell crank 101, which is connected with the valve-rod 100 and is pivotally mounted on the frame its lower end projecting in front of a lug 103 on the horizontal sliding rod 102. This rod, which is drawn inwardly by a spring 104 is at its other end connected with an arm 105, which is pivoted at its lower end and carries a lug 106, which rests against the above mentioned lever 73, which effects the lifting of the mold 64. When this lifting takes place the arm 105 and rod 102 are also carried with it, so that the valve rod is thereby moved.

Claims.

1. In a machine for manufacturing horseshoes, the combination, with blank forming rolls arranged to form separate blanks, means to receive and straighten the blanks as they come from the rolls, means to bend the blank into the form of a shoe, and automatically acting means to feed the blank from the straightening device to the bending device, all in one continuous operation.

2. In a machine for manufacturing horseshoes, the combination, with rolls provided in their opposing faces with molds to form individual blanks with toe and heel calks, means to straighten the blanks as they emerge from the rolls, means acting parallel to the axes of the rolls to bend the blank into the form of a shoe, means for creasing and punching the shoe, and means to automatically feed the blank progressively from the straightening device to the bending device, to the creasing and punching device.

3. In a machine for manufacturing horseshoes, the combination with a rolling apparatus for lengthening and forming the blank, a bending apparatus, and a connecting channel, of a hammer disposed above the channel and operating to straighten the blank after the rolling operation, and means for automatically bringing the blank to rest in the proper position and operating said hammer.

4. In a machine for manufacturing horseshoes, the combination with a blank-forming roll having a groove co-extensive with the blank to be formed therein, a mold adapted to form toe and heel calks on the blank, and ejectors radially movable in the roll and serving to force the blank out of the mold progressively as the roll rotates, of a feed channel leading from the rolls, a rib secured on the frame and serving as a guide to conduct the blank into the channel and to straighten the same, means for conveying the blank along the channel, a drop hammer operating at right angles to the axes of the rolls to smooth the blank, a slide movable transversely in relation to the said channel, a roller at each side of the slide, a mold carried by the slide, said mold being mounted on an arm pivoted so as to be capable of swinging in a vertical plane and adapted to withstand a force applied in a horizontal plane, dies arranged laterally of the mold when in its horizontal position, said dies being movable in a horizontal plane transversely of the movement of the slide, means for moving the slide with the mold against the blank so as to press the same between the rollers thus serving to bend the blank around the mold, means for pressing the dies against the rear parts of the shoe and causing the same to conform to the shape of the mold, means for automatically swinging the arm with the mold up from the plane of the slide, and a hammer arranged above the slide and provided on its face with means for creasing and punching the shoe.

In witness whereof I have hereunto set my hand in presence of two witnesses.

CARL EMIL PEDERSEN.

Witnesses:
ALFRED J. BRYN,
JOH. VAALER.